May 21, 1935. F. O. BLAIR 2,001,899
PROCESS AND APPARATUS FOR ACID TREATING LIGHT MINERAL OIL
Filed Dec. 11, 1929
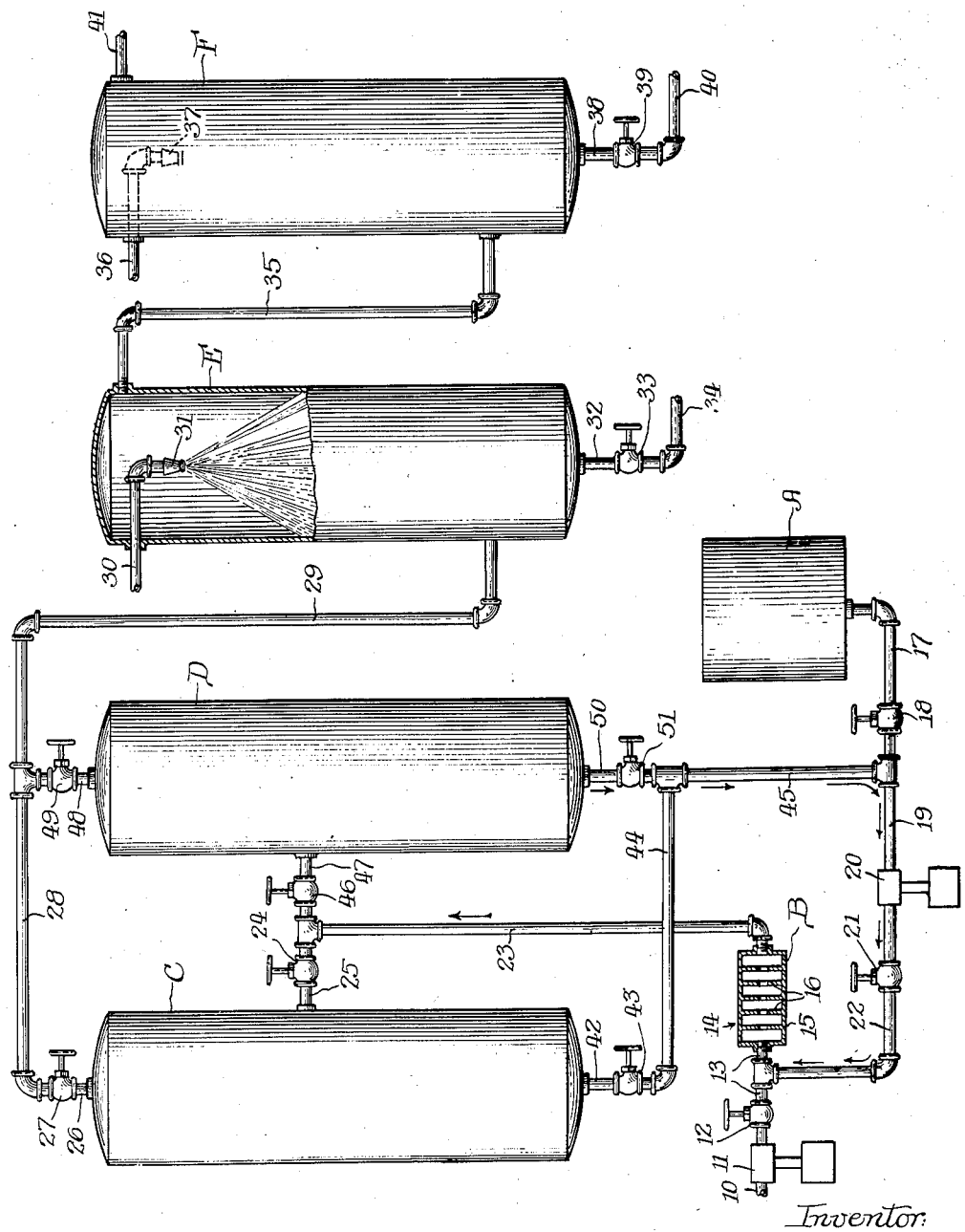
Inventor:
Frank O Blair
Bruce K. Brown Atty.

Patented May 21, 1935

2,001,899

UNITED STATES PATENT OFFICE 2,001,899

PROCESS AND APPARATUS FOR ACID TREATING LIGHT MINERAL OIL

Frank O. Blair, Laramie, Wyo., assignor to Standard Oil Company, Chicago, Ill., a corporation of Indiana Application December 11, 1929, Serial No. 413,351

5 Claims. (Cl. 196—40)

This invention relates to an apparatus and a process for treating oil and it pertains more particularly to the treatment of pressure distillate with sulfuric acid for the removal of unsaturated hydrocarbons, gum forming resins, coloring matter, etc.

Pressure distillate is the gasoline fraction obtained from cracking stills, and is characterized by its tendency to discolor and form gums on standing. To remove the unsaturated hydrocarbons and materials responsible for this deterioration the pressure distillate must be subjected to a treatment with sulfuric acid. Only a small amount of the treating acid is actually used up in this process and it is therefore necessary to transfer the sludge to an acid plant for recovering and restoring the unused acid remaining in the sludge. The hydrolyzing, separating and restoring of the sludge acid is objectionable and difficult because of the corrosive nature of the materials, because of the amount of equipment, time, labor and expense required and because of the unavoidable sulfuric anhydride fumes which are wafted from the acid works to all parts of the refinery, corroding exposed metal parts and depleting the health and efficiency of the workmen. The object of my invention is to overcome all of these objectionable features and to eliminate the acid recovery plant by providing a process in which the treating acid is almost completely utilized.

A further object is to provide a process for treating pressure distillate in which the consumption of acid is materially reduced and in which the cost of equipment and operation is likewise minimized.

A further object is to provide a new and improved arrangement of apparatus whereby pressure distillate may be treated by my improved process.

Other objects will be apparent as the detailed description of my invention proceeds.

My invention contemplates a process in which pressure distillate is treated with sulfuric acid and discharged into a settling tank until a quantity of sludge is accumulated in said tank. Larger quantities of the accumulated sludge from this tank are then used instead of sulfuric acid for the treatment of further quantities of pressure distillate, the mixture being discharged into a second settling tank. This process is continued until the sludge from the first tank is entirely used up at which time the sludge from the second tank is used in still larger quantities to treat pressure distillate, the mixture being introduced into the first separating tank. By gradually increasing the amount of sludge used to treat the pressure distillate in each step, I find that I can effectively remove or polymerize all objectionable unsaturated hydrocarbons, and at the same time I can utilize the acid to such an extent that there is no necessity of recovering or reconcentrating it. The final sludge contains practically no free acid and it consists almost entirely of hydrocarbon derivatives of sulfuric acid. It may be burned as a fuel. This sludge, however, does contain combined acid which may be separated from the hydrocarbon radical by hydrolysis and gives the tests for free acid if mixed with water.

In the accompanying drawing, I have shown diagrammatically an arrangement of apparatus for carrying out my improved process.

Briefly, incoming pressure distillate, which has been carefully dried, is mixed with acid from tank A in orifice mixer B, settled in tank C or D and finally washed and treated in tanks E and F. Additional drying, washing and/or treating tanks may be required for various oils or pressure distillates and I contemplate the use of any and all apparatus and processes which are known to those skilled in this art.

Pressure distillate is pumped from a storage tank through pipe 10 by pump 11 in quantities regulated by valve 12, through pipe 13 to a "knothole" or orifice mixer 14. This mixer may consist of a cylindrical casing 15 having a plurality of baffle plates 16 mounted therein, each of said plates having small holes at their center so that liquids forced therethrough at high velocities will circulate in the spaces between the plates to produce a thorough and uniform mixture.

The acid used in my process is pumped from storage tank A through pipe 17, valve 18 and pipe 19 by pump 20 through regulating valve 21, pipe 22 and pipe 13 to the orifice mixer B where it is thoroughly mixed with the pressure distillate as above described.

The acid mixture is conducted through conduit 23, valve 24 and pipe 25 to settling tank C. The sludge rapidly settles to the bottom of this tank and the treated pressure distillate is discharged through pipe 26, valve 27 and pipes 28 and 29 to a point adjacent the bottom of washing tower E where water from a suitable source is supplied through pipe 30 and sprayed through the treated material by nozzle 31.

The water and impurities washed out of the treated distillate may be removed through pipe 32, valve 33 and pipe 34. The washed distillate is transferred from the top of tower E by pipe 55

35 to a point near the bottom of treating tank F where a doctor solution is introduced through pipe 36 and sprayed through the washed distillate by nozzle 37. The treating liquid is removed from the bottom of tower F through pipe 38, valve 39 and pipe 40, the sweetened distillate being transferred by pipe 41 to a suitable storage tank.

It is understood that any number of washing or treating towers may be used and that additional towers may be used for drying the distillate as is well known to those skilled in the art.

When the tower C, which is preferably about 10 ft. in diameter and 25 ft. high, has accumulated a sufficient amount of sludge (when 22,500 pounds of acid have been used to treat 6000 barrels of pressure distillate) the valve 18 is closed and instead of using acid for the treatment of incoming pressure distillate, sludge is withdrawn from the bottom of tower C through pipe 42, valve 43, pipes 44, 45 and 19 by pump 20 and is discharged through valve 21 and pipes 22 and 13 to the orifice mixer B'. At the same time valve 24 is closed and the orifice mixer discharges through pipe 23, open valve 46 and pipe 47 to the second treating tower D, the treated pressure distillate being discharged through pipe 48, valve 49 and pipe 29 to the washing tower E as above described. Sludge is now accumulated in separating tank D.

When the treated sludge from tank C has been transferred to tank D, valve 43 is closed and sludge from tank D is pumped through pipe 50, valve 51, pipes 45 and 19 by pump 20 through valve 21 and pipes 22 and 13 to the orifice mixer which discharges again into tower C, valve 24 being opened and valve 46 being closed.

For the first treatment when fresh acid (about 59° Bé.) is used and about 4 pounds of acid will be required per barrel of pressure distillate treated, valves 43, 46, 49, and 51 being closed. After 6000 barrels of pressure distillate have been treated, valves 18, 24, and 51 are closed and valves 43, 46 and 49 are open, the sludge from tank C being mixed with incoming pressure distillate at the rate of about 5 pounds per barrel. When the sludge from tank C has been entirely transferred to tank D, valves 43 and 46 are closed and valves 24 and 51 are opened, and the sludge from tank D is mixed with incoming pressure distillate at the rate of about 6 pounds per barrel. After this is complete valves 24 and 50 are closed and valves 43 and 46 are opened, the sludge from tank C being mixed with incoming pressure distillate, using about 7 pounds per barrel. About two more treatments of 8 and 9 pounds per barrel respectively will sufficiently utilize the acid in the sludge so that it may then be run to a suitable storage tank by a conduit (not shown) for use as a fuel or for the recovery of organic compounds formed by the treatment. The amounts of acid, as above stated, refer to the active acid content of the sludge. The volume of sludge will be dependent on the amount of impurities removed, and in the final treatment, the volume of sludge per volume of oil treated may be ten times the original volume of acid used.

While I have shown two treating tanks, C and D, it is understood that I do not limit myself to this system. I may use a single tank and continuously remove the sludge from the bottom thereof, supplying it in increasing amounts to the fresh pressure distillate. Again, I may run the sludge to separate tanks and use it as needed therefrom. It is only essential that I increase the amount of the treating reagent as the acid content of the sludge is depleted, and that I utilize the acid to such an extent that its recovery is rendered uneconomical and unnecessary.

While I have described a process for treating pressure distillate, it will be evident that the process is applicable to the treatment of other hydrocarbon oils and I do not limit myself to any particular charging stock.

It is important for the successful operation of my process that the oil or pressure distillate be thoroughly dried before it is introduced into the orifice mixer because the treating acid is ineffective in dilute solutions. The temperature of the treatment should preferably be maintained at about 70° F.

The sludge at the end of the cycle has about the following properties:

| | |
|---|---|
| Color | Black |
| Specific gravity | 1.174 |
| Wt. per gal | 9.78 lbs. |
| Vis. (furol at 122° F.) | about 100 |
| Net fuel value | 9,810 B. t. u./lb. |

(100 gal. sludge equivalent to 62 gals. of fuel oil.)

*Chemical composition*

| | Per cent |
|---|---|
| Water | 6.0 |
| $H_2SO_4$ (in combination) | 33.7 |
| Oil (in combination) | 40.3 |

The method above described cuts down the total acid consumption to about one-fourth of the normal amount, but it should be noted that in this process each barrel of oil is actually contacted with as much or more acid than by the old method, thus giving a better product. My process contemplates the re-use of sludge on untreated oil until the free acid in the sludge is substantially utilized. The cost of treatment is materially reduced, the corrosive and disagreeable sulfuric acid gases are eliminated and a better and more stable product is produced.

I claim:

1. In apparatus of the class described for treating mineral oils, a plurality of settling tanks, a mixer, a means for supplying oil to said mixer, means for supplying a treating agent to said mixer, selective means for transferring a mixture of oil and treating agent from said mixer to either of said tanks, and selective means for returning settled materials from either of said tanks to said mixer.

2. In combination for mineral oil refining, a mixer, means for supplying oil to said mixer, means for supplying a treating fluid to said mixer, a pair of tanks, selective means for transferring fluids from said mixer to either of said tanks, selective means for returning liquids from the bottom part of said tanks to said mixer, and means for removing treating fluids from the treated oil discharged from said pair of tanks.

3. The process of acid treating a light mineral oil which comprises thoroughly mixing and agitating said oil and sulfuric acid sludge, passing said mixture of oil and acid sludge to a settling zone where the sulfuric acid sludge is permitted to settle, removing the settled sludge, thoroughly mixing and agitating said settled acid sludge with another portion of untreated light mineral oil, the amount of sulfuric acid sludge being greater than the amount used in the first treatment, passing the second mixture of sulfuric acid sludge and oil to a second settling zone where the sludge is again permitted to settle, and removing the used sulfuric acid sludge from the treated oil.

4. The process of acid treating pressure distillate oils which comprises thoroughly mixing and agitating said oil and sulfuric acid sludge, passing said mixture of oil and acid sludge to a quiescent settling zone where the sulfuric acid sludge is permitted to settle, removing the settled sludge, thoroughly mixing and agitating said settled acid sludge with another portion of untreated pressure distillate oil, the amount of sulfuric acid sludge being greater than the amount used in the first treatment, passing the second mixture of sulfuric acid sludge and oil to a second quiescent settling zone where the sludge is again permitted to settle, and removing the used sulfuric acid sludge from the oil.

5. The process of acid treating a light mineral oil which comprises thoroughly mixing and agitating said oil and sulfuric acid sludge, passing said mixture to a settling zone where the sulfuric acid sludge separates from the treated oil, removing the settled sludge from the treated oil and then thoroughly mixing and agitating said sludge with another portion of untreated light mineral oil, the amount of said acid sludge being greater than the amount used in the first treatment, passing the second mixture of sulfuric acid sludge and oil to a second settling zone where said sludge is again separated from the oil, removing the sludge from the treated oil, collecting the two portions of treated oil and washing the same countercurrently with water and then treating said washed oil countercurrently with a solution of doctor.

FRANK O. BLAIR.